Patented Dec. 15, 1931

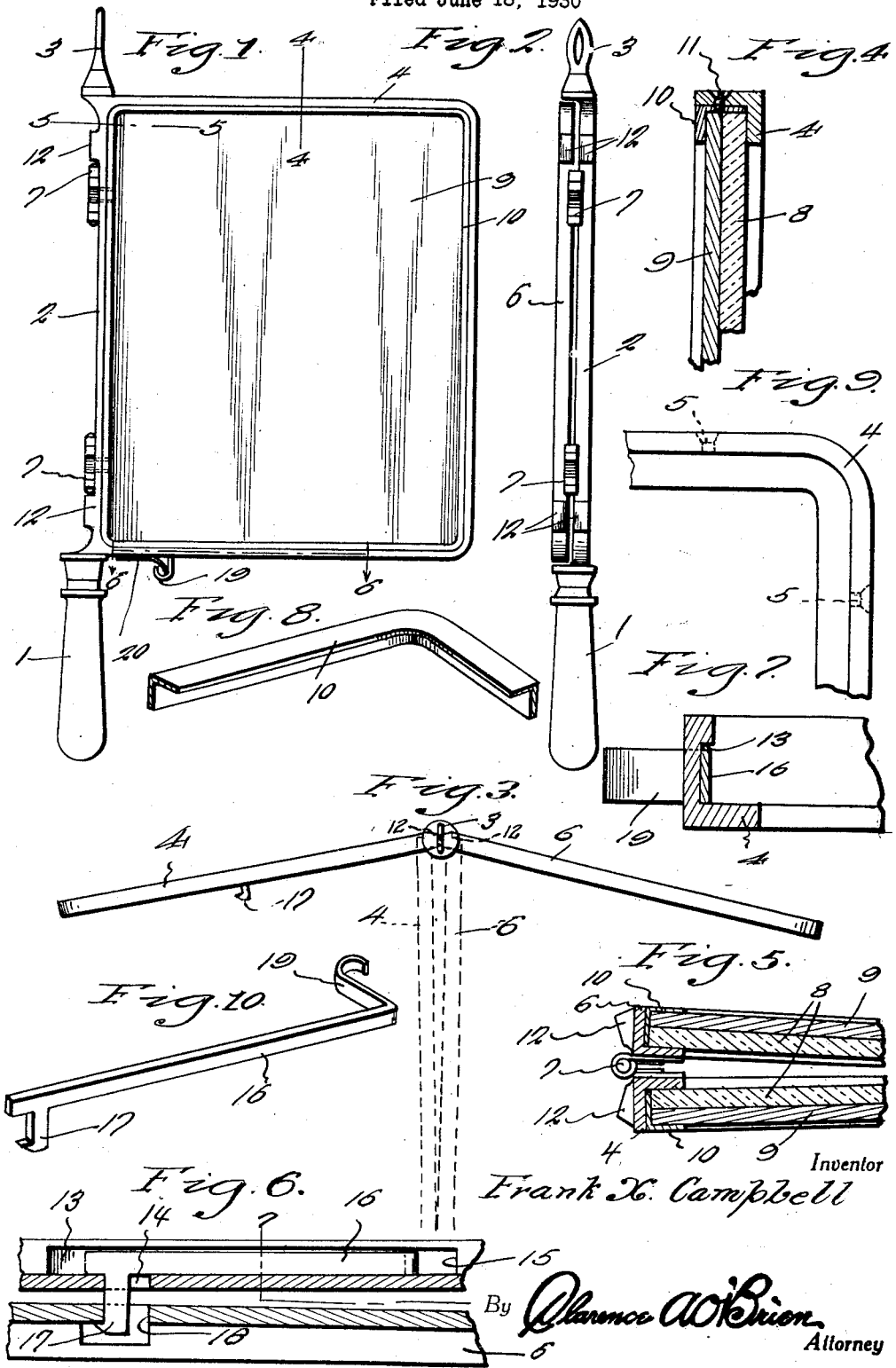

1,836,900

UNITED STATES PATENT OFFICE

FRANK X. CAMPBELL, OF BRONX, NEW YORK

MIRROR

Application filed June 18, 1930. Serial No. 462,044.

This invention pertains to mirrors of the general character disclosed in my co-pending applications which bear Serial Nos. 424,000 filed January 28, 1930 and 447,253, filed April 25, 1930.

An important feature of the present invention resides in the provision of a pair of hingedly connected mirrors having a novel latch device operatively mounted thereon for releasably securing said mirrors in closed or inoperative position.

In the drawings wherein a preferred embodiment of the invention is disclosed, it will be seen that:—

Figure 1 is a view in elevation of a mirror constructed in accordance with this invention in closed position.

Figure 2 is a view in elevation looking at the hinged edges of the mirror frames.

Figure 3 is a top plan view showing the mirrors in opened position.

Figure 4 is a fragmentary detail sectional view on an enlarged scale taken substantially on the line 4—4 of Figure 1.

Figure 5 is a fragmentary detail horizontal sectional view taken substantially on the line 5—5 of Figure 1.

Figure 6 is a fragmentary detail horizontal sectional view taken substantially on the line 6—6 of Figure 1 showing the latching device.

Figure 7 is a sectional view taken substantially on the line 7—7 of Figure 6.

Figure 8 is a fragmentary view in perspective showing a corner portion of one of the removable mirror securing frames.

Figure 9 is a fragmentary view in elevation showing a corner portion of one of the mirror supporting frames.

Figure 10 is a detail view in perspective of the latch.

Referring to the drawings in detail, it will be seen that a handle is designated by the reference numeral 1 and extending from one end of said handle 1 is a laterally offset elongated metallic bar 2 on the free end of which is mounted the eye 3 for suspending the mirror from a suitable support, such as a hook or nail. The eye 3 is disposed coaxially with respect to the handle 1. The bar 2 constitutes one side of a mirror supporting frame 4 of angle iron cross section having in one of the flanges thereof countersunk spaced openings 5. A swingable frame 6 is hingedly mounted as at 7 on the bar portion 2 of the frame 4, the hinges 7 being of the spring type for yieldingly urging the frame 6 to open position away from the frame 4. It may be well to here state that the frame 6 is identical in construction to the frame 4 with the exception of certain details which will be presently set forth.

Mounted in each of the frames 4 and 6 is a mirror 8 and behind each of said mirrors is a backing plate of any suitable material 9. The marginal edges of the mirrors 8 and the backing plates 9 are spaced slightly from the opposed walls of the frames 4 and 6 for the reception of the removable metallic securing frames 10 of angular cross section, one of the angles of which extends between the frames 4 and 6 and the mirrors and backing plates 8 and 9 and the other angle of which extends over the respective backing plates 9 in a manner to secure the same and the mirrors in position in the frames 4 and 6. This arrangement is best seen in Figure 5 of the drawings. As illustrated to advantage in Figure 4 of the drawings, screws 11 pass through the countersunk openings 5 in the frames 4 and 6 and are threaded into the frames 10 to secure the same in position. Stop lugs 12 are formed integrally on the hinged edges of the mirror supporting frames 4 and 6 for abutting engagement with each other in a manner to limit the swinging movement of the frame 6 away from the frame 4 as best seen in Figures 2 and 3 of the drawings.

Referring now to Figures 6 and 7, it will be seen that the horizontal lower portion of the frame 4 is slightly thickened to permit the formation on the interior thereof of an elongated recess or groove 13 with which an opening 14 communicates. The opening 14 is adjacent one end of the groove 13 and is formed in the portion of the frame 4 which is opposed to the frame 6 when the frames are in closed position. Communicating with the opposite end of the groove 13 and in the horizontal portion of the frame 4 is another opening 15. A latch 16 is mounted for sliding movement in the groove 13 and has formed on one end portion the hook 17 which is operable through the opening 14 and an opening 18 in the opposed face of the frame 6 for engagement with said frame 6 in a manner to secure the frames together against the swinging movement. At its opposite end the latch 16 terminates in a handle 19 extending at right angles with respect to the hook 17 and operable through the opening 15. A leaf spring 20 is fixed on the frame 4 and engaged with the handle 19 in a manner to yieldingly shift the latch to operative position. It will be noted from a study of Figure 1 that the handle 19 is located at a point convenient to the handle 1 in order that the finger of a person holding the mirror may be conveniently engaged therewith in a manner to actuate the latch 16 against the tension of the spring 20.

In use, a mirror may be held in one hand by the handle and the latch actuated by one of the fingers of said one hand to release the frame 6 which is swung to open position by the spring hinges 7. As before stated, the stop lugs 12 arrest the swinging movement of the frame 6 at a predetermined degree of angularity with respect to the frame 4.

It will thus be seen that I have provided a mirror which is particularly useful for barbers which is neat and attractive in appearance, highly efficient in use and which embodies a novel construction and arrangement of parts whereby the same may be conveniently operated. It is understood, of course, that changes in structural details may be resorted to without departing from the spirit of the invention as claimed.

What is claimed is:—

In a structure of the character described, a handle, a rigid bar projecting in parallelism from one end of the handle, said bar laterally offset from the longitudinal axis of the handle, a frame formed integrally on the bar, said bar constituting one of the sides of the frame, another frame hingedly mounted on the bar for swinging movement toward and away from the first named frame, stop lugs formed integrally on the bar and the swinging frame for abutting engagement with each other in a manner to limit the swinging movement of the second named frame, resilient means for yieldingly urging the swingable frame away from the first named frame, and means for releasably securing the swingable frame to the first named frame to retain said swingable frame against swinging movement, said means comprising a latch slidably mounted in a groove provided therefor in the first named frame, said first named frame and the swingable frame having openings therein registering with each other when the frames are in opposed relation to each other, the opening in the first named frame communicating with one end portion of the groove, a latch hook extending from the latch and operable through the openings, the first named frame being further provided with an opening communicating with the opposite end portion of the groove, and an operating handle formed integrally on the latch and operable through the last named opening, and resilient means mounted on the first named frame engaged with the operating handle in a manner to move the latch to operative position.

In testimony whereof I affix my signature.
FRANK X. CAMPBELL.